US008919102B2

(12) United States Patent
Sato et al.

(10) Patent No.: US 8,919,102 B2
(45) Date of Patent: Dec. 30, 2014

(54) EXHAUST PURIFYING DEVICE FOR INTERNAL COMBUSTION ENGINES

(75) Inventors: Masaaki Sato, Susono (JP); Tomihisa Oda, Numazu (JP); Shinya Asaura, Mishima (JP); Shunsuke Toshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 799 days.

(21) Appl. No.: 13/144,158

(22) PCT Filed: Jan. 13, 2009

(86) PCT No.: PCT/JP2009/050330
§ 371 (c)(1),
(2), (4) Date: Jul. 12, 2011

(87) PCT Pub. No.: WO2010/082307
PCT Pub. Date: Jul. 22, 2010

(65) Prior Publication Data
US 2011/0271663 A1 Nov. 10, 2011

(51) Int. Cl.
*F01N 3/00* (2006.01)
*F01N 3/20* (2006.01)
*F01N 3/10* (2006.01)
*F02M 25/07* (2006.01)
*F01N 13/00* (2010.01)
*B01D 53/94* (2006.01)

(52) U.S. Cl.
CPC ............... *F01N 3/208* (2013.01); *F01N 3/103* (2013.01); *F02M 25/0744* (2013.01);
(Continued)

(58) Field of Classification Search
USPC .................. 60/274, 295, 311, 285, 286, 301
See application file for complete search history.

(56) References Cited

U.S. PATENT DOCUMENTS 6,017,503 A * 1/2000 Kato et al. ................. 423/235
6,427,439 B1 * 8/2002 Xu et al. ...................... 60/286
(Continued)

FOREIGN PATENT DOCUMENTS

JP A-10-33948 2/1998
JP A-2003-293740 10/2003
(Continued)

OTHER PUBLICATIONS

International Search Report issued in International Application No. PCT/JP2009/050330 on Jul. 7, 2009 (with translation).

*Primary Examiner* — Thomas Denion
*Assistant Examiner* — Patrick Maines
(74) *Attorney, Agent, or Firm* — Oliff PLC

(57) ABSTRACT

An exhaust purifying device for an internal combustion engine which can restrict an influence of a measurement error in a NOx sensor provided at the downstream side of a catalyst and can optimally maintain a NOx purifying rate. The device includes a catalytic converter carrying a selective catalytic reduction catalyst provided in an exhaust passage of the engine to selectively reduce nitrogen oxides, a urea water adding valve for adding urea water to the catalyst as a reducing agent, a NOx sensor provided at the downstream side of the catalyst, and an ECU for adjusting an addition amount of the urea water adding valve based upon output of the NOx sensor, wherein a urea water addition amount adjusting process is executed under a condition that a NOx amount to be generated in the engine increases.

6 Claims, 4 Drawing Sheets

(52) U.S. Cl.
CPC ......... *F01N 13/009* (2014.06); *B01D 53/9418* (2013.01); *B01D 53/9495* (2013.01); *B01D 2251/2067* (2013.01); *B01D 2258/012* (2013.01); *F01N 2560/026* (2013.01); *F01N 2610/02* (2013.01); *F01N 2900/0412* (2013.01); *F01N 2900/0421* (2013.01); *F01N 2900/0422* (2013.01); *F01N 2900/1402* (2013.01); *Y02T 10/121* (2013.01); *Y02T 10/24* (2013.01)
USPC .................. 60/295; 60/285; 60/286; 60/301

(56) References Cited

U.S. PATENT DOCUMENTS

| | | | |
|---|---|---|---|
| 6,546,720 B2* | 4/2003 | van Nieuwstadt | 60/286 |
| 2004/0203162 A1* | 10/2004 | Wickert | 436/55 |
| 2005/0282285 A1* | 12/2005 | Radhamohan et al. | 436/55 |
| 2006/0080952 A1* | 4/2006 | Wickert et al. | 60/286 |
| 2006/0086080 A1 | 4/2006 | Katogi et al. | |
| 2006/0096278 A1* | 5/2006 | Lueders et al. | 60/286 |
| 2008/0202104 A1* | 8/2008 | Ichikawa | 60/295 |
| 2009/0049899 A1 | 2/2009 | Hjorsberg et al. | |

FOREIGN PATENT DOCUMENTS

| | | |
|---|---|---|
| JP | A-2003-293743 | 10/2003 |
| JP | A-2005-127256 | 5/2005 |
| JP | A-2006-125247 | 5/2006 |
| JP | A-2007-327377 | 12/2007 |
| JP | A-2008-215315 | 9/2008 |
| WO | WO 2007/037730 A1 | 4/2007 |

* cited by examiner

EXHAUST PURIFYING DEVICE FOR INTERNAL COMBUSTION ENGINES

TECHNICAL FIELD

The present invention relates to an exhaust purifying device for an internal combustion engine.

BACKGROUND ART

There is generally known a NOx catalyst for purifying nitrogen oxides (NOx) contained in an exhaust gas, as an exhaust purifying device arranged in an exhaust system for an internal combustion engine such as a diesel engine. Various types of NOx catalysts are known as the NOx catalyst, but among them, there is well known in public a selective catalytic reduction type NOx catalyst for sequentially reducing and removing NOx by addition of a reducing agent. Urea water or ammonia is known as the reducing agent. Urea water in which water and urea are mixed in a given ratio is usually injected and supplied in an exhaust gas upstream of the catalyst, and urea contained in the urea solution is hydrolyzed by heat of the exhaust gas or the like to generate ammonia. In addition, by a reduction function of the ammonia which removes oxygen from NOx on the NOx catalyst, which will be back to nitrogen, NOx in the exhaust gas is purified.

Patent Document 1 discloses the technology of adjusting an amount of urea water or ammonia to be added to a selective catalytic reduction type NOx catalyst for maintaining a high, stable NOx purifying rate. Specially in Patent Document 1, NOx sensors are provided respectively at the upstream side and at the downstream side of the selective catalytic reduction type NOx catalyst, an actual NOx purifying rate is calculated based upon output of these NOx sensors, and an addition amount of the reducing agent is adjusted based upon comparison between the actual purifying rate and a target purifying rate.

Patent Document 1: Japanese Patent Laid-Open No. 2003-293743

DISCLOSURE OF THE INVENTION

Technical Problem

Incidentally, followed by reinforcement of exhaust gas regulations in the future, it is estimated that a NOx concentration contained in an exhaust gas purified by an exhaust purifying device complying with the exhaust gas regulations will be extremely low, for example, the order of several ppm. On the other hand, a measurement error of the NOx sensor provided at the downstream side of the selective catalytic reduction catalyst is currently the order of plus or minus 10 ppm. Therefore, when the proportion of the measurement error in the output of the NOx sensor is large, there is a possibility that the adjustment of the addition amount of the reducing agent to the selective catalytic reduction catalyst can not be appropriately made.

The present invention is made in view of the foregoing problem, and an object of the present invention is to provide an exhaust purifying device for an internal combustion engine which can restrict an influence of a measurement error of a NOx sensor provided at the downstream side of a selective catalytic reduction catalyst and at the same time, can optimally maintain a NOx purifying rate of the selective catalytic reduction catalyst.

Technical Solution

An exhaust purifying device for an internal combustion engine according to the present invention provided with a selective catalytic reduction catalyst provided in an exhaust passage of the internal combustion engine to selectively reduce nitrogen oxides contained in an exhaust gas, reducing agent adding means for adding urea water or ammonia to the selective catalytic reduction catalyst as a reducing agent, a NOx sensor provided at the downstream side of the selective catalytic reduction catalyst in the exhaust passage, and addition amount adjusting means for adjusting an addition amount of the reducing agent adding means based upon output of the NOx sensor, wherein the addition amount adjusting means is executed under a condition that a NOx amount to be generated in the internal combustion engine increases more than in a normal operating time.

The above construction may adopt the construction in which the condition that the NOx amount to be generated in the internal combustion engine increases includes increasing the NOx amount to be generated in the internal combustion engine.

The above construction may adopt the construction in which the addition amount adjusting means is permitted to be executed in a case where the NOx amount to be generated in the internal combustion engine is larger than the predetermined amount.

The above construction may adopt the construction in which the addition amount adjusting means is prohibited to be executed in a case where the NOx amount to be generated in the internal combustion engine is smaller than the predetermined amount. Preferably the above construction may adopt the construction in which the addition amount adjusting means is forcibly executed each time the time when the execution is prohibited exceeds a predetermined time. More preferably the above construction may adopt the construction in which at the time the addition amount adjusting means is executed, the NOx amount to be generated in the internal combustion engine is temporarily increased.

The above construction may adopt the construction in which the condition that the NOx amount increases includes a condition that the NOx concentration obtained from the output of the NOx sensor containing a measurement error is a NOx concentration making it possible to identify excess or lack of an ammonia addition amount to be added to the selective catalytic reduction catalyst.

The above construction may adopt the construction in which a NOx amount for determining the condition that the NOx amount to be generated in the internal combustion engine increases is defined based upon a relative ratio between a NOx concentration detected by the NOx sensor and a measurement error in the output of the NOx sensor in the NOx concentration

Advantageous Effects

According to the present invention, since the addition amount of the reducing agent is adjusted in a range where the NOx concentration is relatively high, that is, the ratio of the measurement error in the NOx sensor is small, the influence by the measurement error in the NOx sensor can be restricted, and at the same time, the NOx purifying rate of the selective catalytic reduction catalyst can be optimally maintained.

BEST MODE FOR CARRYING OUT THE INVENTION

Hereinafter, the best embodiment of the present invention will be explained with reference to the accompanying drawings.

Figure 1:
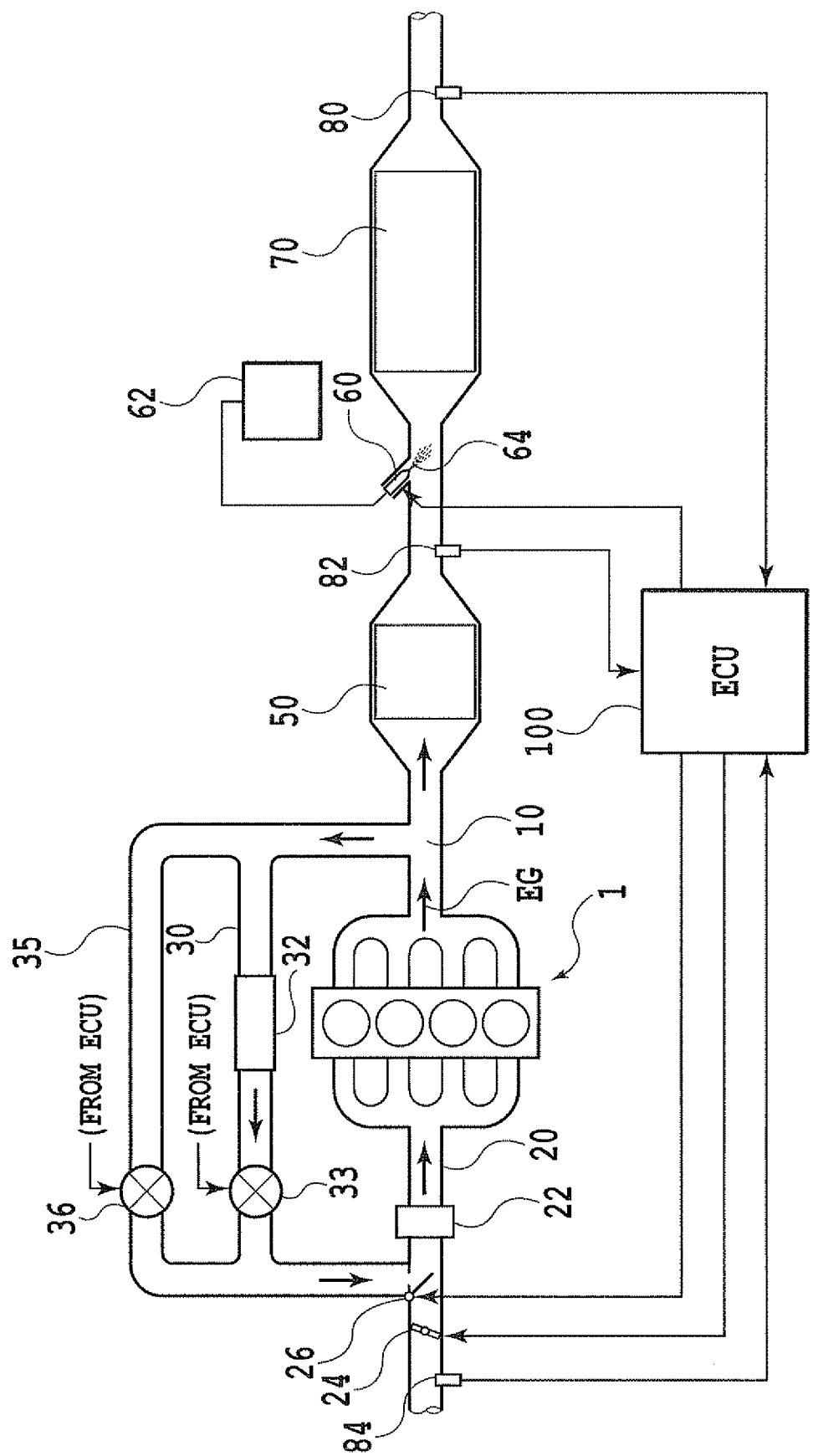
FIG. 1 is a diagram showing the construction of an exhaust purifying device according to an embodiment of the present invention.

FIG. 1 is a construction diagram showing an exhaust purifying device in an internal combustion engine according to an embodiment of the present invention.

An internal combustion engine 1 is a diesel engine, for example, and the internal combustion engine 1 includes an exhaust passage 10 for discharging an exhaust gas EG from each cylinder to an outside, an intake passage 20 for introducing intake air into each cylinder, an EGR (Exhaust Gas Recirculation) passage 30 for recirculating a part of the exhaust gas EG into the intake passage 20, and a bypass passage 35 for bypassing the EGR passage 30.

An oxidation catalytic converter 50, a urea water adding valve 60, and a selective catalytic reduction catalytic converter 70 are provided in the exhaust passage 10 in that order from the upstream side thereof.

The oxidation catalytic converter 50 carries an oxidation catalyst composed of catalytic metal and the like for oxidizing unburned fuel and the like in the exhaust gas EG. A temperature of the exhaust gas EG rises by an oxidation reaction in the oxidation catalytic converter 50.

The urea water adding valve 60 is connected by a conduit to a urea water tank 62, in which urea water of a predetermined concentration is accommodated. The urea water in the urea water tank 62 is supplied to the urea water adding valve 60 by a pump (not shown), and the urea water adding valve 60 supplies the urea water 64 having an amount corresponding to a control command from an electronically controlled unit (ECU) 100 to be described later to the exhaust passage 10 toward the selective catalytic reduction catalytic converter 70. The urea water added to the exhaust passage 10 is hydrolyzed by heat of the exhaust gas EG to generate ammonia.

The selective catalytic reduction catalytic converter 70 uses a catalytic kind such as zeolite or vanadium to carry a well-known selective catalytic reduction (SCR) catalyst for reducing nitrogen oxides by a so-called urea selective catalytic reduction process. The urea water added from the urea water adding valve 60 is hydrolyzed by heat of the exhaust gas to generate ammonia. The ammonia is absorbed by the selective catalytic reduction catalyst. The selective catalytic reduction catalyst uses ammonia as a reducing agent to selectively reduce NOx contained in the exhaust gas EG to a nitrogen gas and water. The selective catalytic reduction catalytic converter 70 has a well-known structure, and may use the structure having, for example, Si, O, and Al as main components and zeolite containing Fe ions or the structure carrying a catalytic metal such as a vanadium catalyst ($V_2O_5$) on a surface of a substrate made of oxidized aluminum alumina, for example. However, the selective catalytic reduction catalytic converter 70 is not limited thereto.

When an excessive amount of the ammonia beyond the ammonia absorption capability of the selective catalytic reduction catalytic converter 70 is supplied thereto, the ammonia slips the selective catalytic reduction catalyst and is discharged downstream of the selective catalytic reduction catalytic converter 70. Accordingly, it is preferable that an ammonia amount (urea water amount) to be supplied to the selective catalytic reduction catalytic converter 70 is adjusted to an amount to the extent that reduction of NOx is the most efficiently performed and the slip of the ammonia does not occur.

A throttle valve 24, an EGR valve 26, and a surge tank 22 are provided in the intake passage 20 in that order from the upstream side thereof.

The throttle valve 24 adjusts an amount of air to be supplied to the internal combustion engine 1 in response to a control command from the ECU 100.

The EGR valve 26 adjusts an amount of an EGR gas as an exhaust gas to be recirculated to the intake passage 20 via the EGR passage 30 or the bypass passage 35 in response to a control command from the ECU 100.

The EGR passage 30 is provided therein with an EGR cooler 32 and an opening and closing valve 33 downstream thereof.

The EGR cooler 32 cools the EGR gas passing through the EGR passage 30.

The opening and closing valve 33 opens/closes the EGR passage 30 in response to a control command from the ECU 100.

The bypass passage 35 is provided to the EGR passage 30 in such a manner as to bypass the EGR cooler 32 in the EGR passage 30. The bypass passage 35 is provided therein with an opening and closing valve 36 for opening/closing the bypass passage 35 in response to a control command from the ECU 100. The EGR gas flows in the bypass passage 35 by opening the opening and closing valve 36 and closing the opening and closing valve 33.

The ECU 100 is constructed of hardware including a CPU (Central Processing Unit), a ROM (Read Only Memory), a RAM (Read Access Memory), a backup memory such as an EEPROM (Electrically Erasable and Programmable Read Only Memory), an input interface circuit including an A/D converter, a buffer and the like, and an output interface circuit including a drive circuit and the like, and necessary software. Detection signals of a NOx sensor 80 provided at the downstream side of the selective catalytic reduction catalytic converter 70, a temperature sensor 82 for detecting a temperature of an exhaust gas EG flowing into the selective catalytic reduction catalytic converter 70, and an air flow meter 84 provided in the intake passage 20 are inputted to the ECU 100. In addition, the ECU 100 controls spark plugs, fuel injection valves and the like, which are not shown, as well as the throttle valve 24, the EGR valve 26, and the opening and closing valves 33 and 36.

The ECU 100 constitutes addition amount adjusting means for adjusting an addition amount of the urea water adding valve 60 as the reducing agent adding means based upon output of the NOx sensor 80 provided at the downstream side (outlet vicinity) of the selective catalytic reduction catalytic converter 70.

Here, an example of an adjustment method of the urea water addition amount by the ECU 100 will be explained. It should be noted that the adjustment method of the urea water addition amount is not limited thereto.

Figure 2:
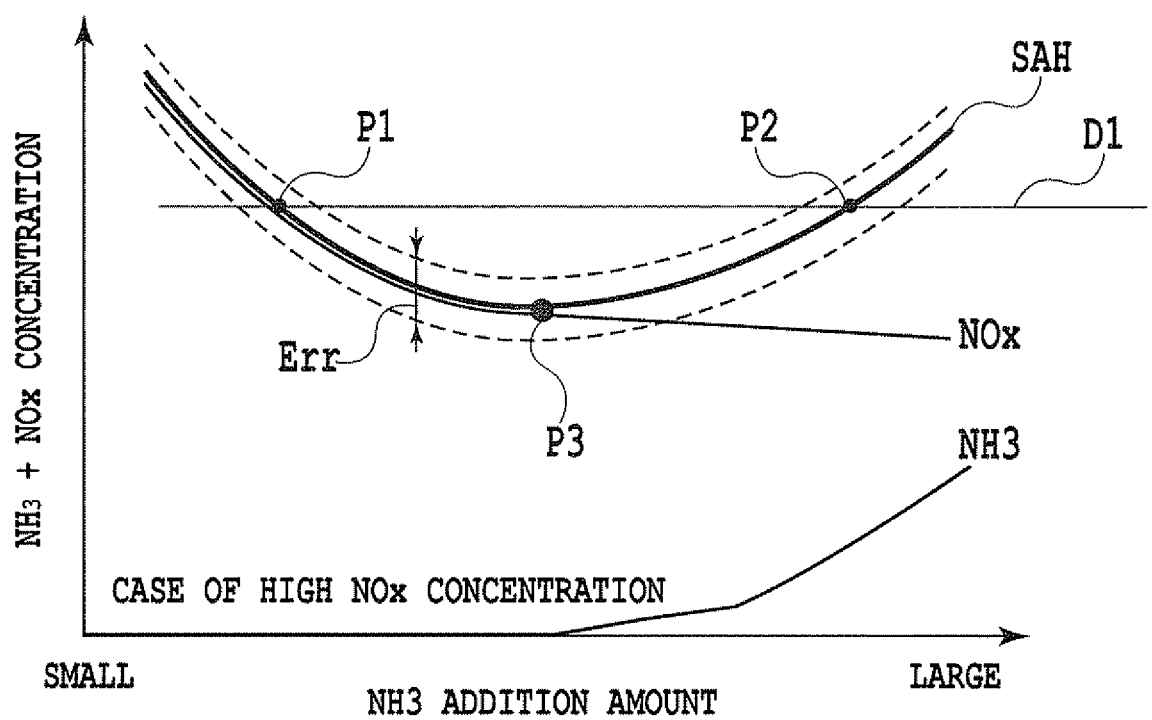
FIG. 2 is a diagram showing an example of a relation between an ammonia addition amount and output of a NOx sensor in a case where a NOX concentration in the vicinity to an outlet of a selective catalytic reduction catalyst converter is relatively high.

FIG. 2 shows an example of output of the NOx sensor 80 to the urea water (ammonia) addition amount to the selective catalytic reduction catalytic converter 70.

In FIG. 2, a code SAH shows output of the NOx sensor 80 and a code Err shows an error of output of the NOx sensor 80. The output SAH of the NOx sensor 80 has an error Err as shown in a dotted line. A magnitude of the error Err is, for example, the order of plus or minus 100 ppm to the output of 100 ppm.

As shown in FIG. 2, the output SAH of the NOx sensor 80 gradually decreases as the ammonia addition amount, that is, an amount of the reducing agent added to the selective catalytic reduction catalytic converter 70 increases and becomes a minimum value in an optimal ammonia addition amount.

In addition, as the ammonia addition amount to the selective catalytic reduction catalytic converter 70 is increased, an ammonia amount slipped from the selective catalytic reduction catalytic converter 70 also increases. Since the NOx sensor 80 also reacts to the ammonia, the output SAH of the NOx sensor 80 also increases according to the slipped ammonia amount.

In FIG. 2, in a case where the output SAH of the NOx sensor 80 is D1, it is a state P1 where the NOx is not sufficiently reduced because the ammonia addition amount to the selective catalytic reduction catalytic converter 70 is lacking, or it is a state P2 where the ammonia addition amount to the selective catalytic reduction catalytic converter 70 is excessive and the NOx is sufficiently reduced, but the ammonia is slipped from the selective catalytic reduction catalytic converter 70.

For changing the state where the output SAH of the NOx sensor 80 is D1 to an optimal state 23 where the NOx concentration is the lowest by adjusting the ammonia addition amount, it is necessary to detect whether the current state is P1 or P2, that is, the ammonia is lacking or excessive. For detecting the current state, for example, the ammonia addition amount is decreased or increased.

For example, in the state of P1, as the ammonia addition amount to the selective catalytic reduction catalytic converter 70 is decreased, the NOx amount to be reduced would be further decreased and the output SAH of the NOx sensor 80 would be higher than D1. On the other hand, in the state of P2, as the ammonia addition amount to the selective catalytic reduction catalytic converter 70 is decreased, and the output SAH of the NOx sensor 80 would be lower than D1, since the ammonia amount slipped from the selective catalytic reduction catalytic converter 70 would be decreased. Accordingly, when the ammonia addition amount to the selective catalytic reduction catalytic converter 70 is decreased, in a case where the output SAH of the NOx sensor 80 increases, it can be detected that the current state is the state of P1, and in a case where the output SAH of the NOx sensor 80 decreases, it can be detected that the current state is the state of P2.

Accordingly, when it is comprehended whether the current state is the state of P1 or P2, the ammonia addition amount, that is, the urea water addition amount from the urea water adding valve 60, is adjusted in accordance with the comprehension, making it possible to set the ammonia addition amount to an optimal amount, that is, change the current state to the state of P3.

As shown in FIG. 2, in a case where a ratio of the error Err to the magnitude of the output SAH of the NOx sensor 80 is relatively small, that is, in a case where the NOx concentration at the outlet of the selective catalytic reduction catalytic converter 70 is relatively high, the ammonia addition amount to the selective catalytic reduction catalytic converter 70 can be adjusted to an optimal amount based upon the output SAH of the NOx sensor 80.

Figure 3:
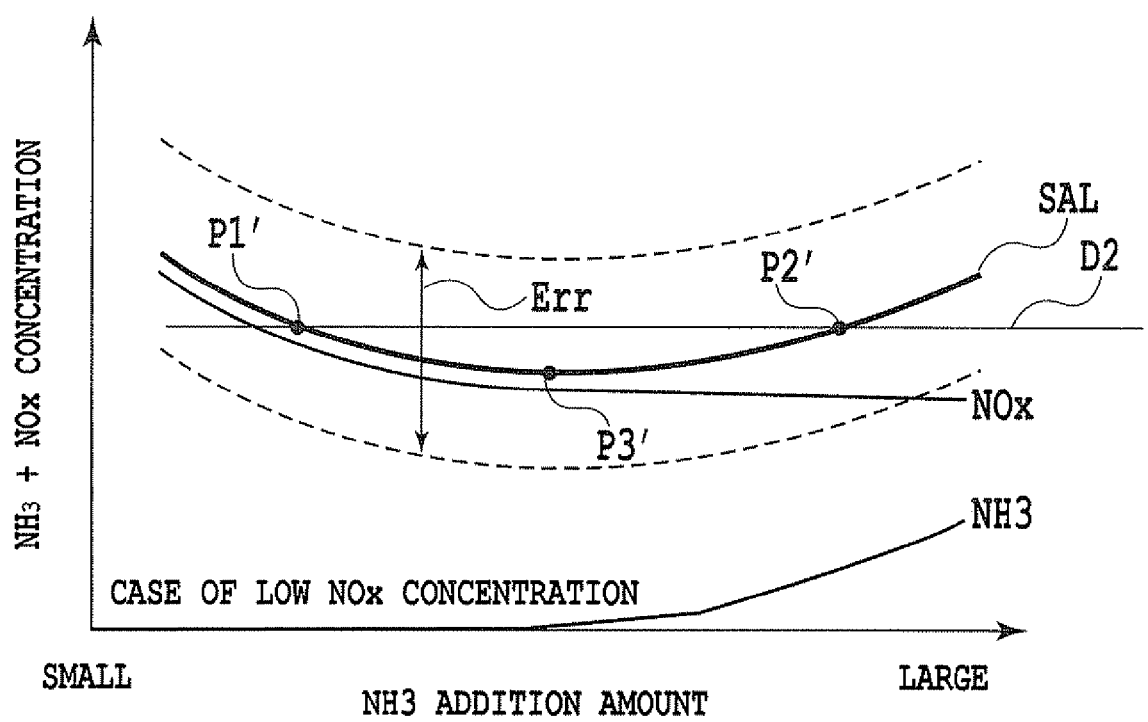
FIG. 3 is a diagram showing an example of a relation between an ammonia addition amount and output of a NOx sensor in a case where a NOX concentration in the vicinity to an outlet of a selective catalytic reduction catalyst converter is relatively low.

FIG. 3 is a diagram showing an example of a relation between an ammonia addition amount and output of a NOx sensor in a case where a NOX concentration in the vicinity to an outlet of a selective catalytic reduction catalytic converter is relatively low. In FIG. 3, a code SAL shows output of the NOx sensor 80 and a code Err shows an error in the output of the NOx sensor 80.

As shown in FIG. 3, in a case where the NOX concentration at the outlet of the selective catalytic reduction catalytic converter 70 is relatively low, a ratio of the error Err to a magnitude of the output SAL of the NOx sensor 80 would be relatively large. Therefore, in a state where a value of the output SAL of the NOx sensor 80 is D2 for example, it is a state P1' where the NOx is not sufficiently reduced since the ammonia addition amount to the selective catalytic reduction catalytic converter 70 is lacking, or it is a state P2' where the ammonia addition amount to the selective catalytic reduction catalytic converter 70 is excessive, and the NOx is sufficiently reduced, but the ammonia is slipped from the selective catalytic reduction catalytic converter 70.

In a case where the ammonia addition amount to the selective catalytic reduction catalytic converter 70 is adjusted to change the state of P1' or P2' to an optimal state of P3' where the output of the NOx sensor 80 is the minimum value, it is necessary to determine whether the current state is P1' or P2'. However, as shown in FIG. 3, when a ratio of the error Err to a magnitude of the output SAL of the NOx sensor 80 is large, it is difficult to determine whether the ammonia addition amount to the selective catalytic reduction catalytic converter 70 is lacking or excessive unless the ammonia addition amount is largely increased or decreased.

Therefore, in the present embodiment, in a case where the NOx concentration of the output in the selective catalytic reduction catalytic converter 70 is in a region where it can not be determined whether the ammonia addition amount to the selective catalytic reduction catalytic converter 70 is lacking or excessive as shown in FIG. 3, the adjustment of the urea water addition amount to the selective catalytic reduction catalytic converter 70 is not executed. That is, in the present embodiment, only in a condition that a state of the ammonia addition amount to be added to the current selective catalytic reduction catalytic converter 70 can be certainly identified from the output of the NOx sensor provided in the vicinity to the outlet in the selective catalytic reduction catalytic converter 70, the adjustment of the urea water addition amount at the urea water adding valve 60 is executed.

Figure 4:
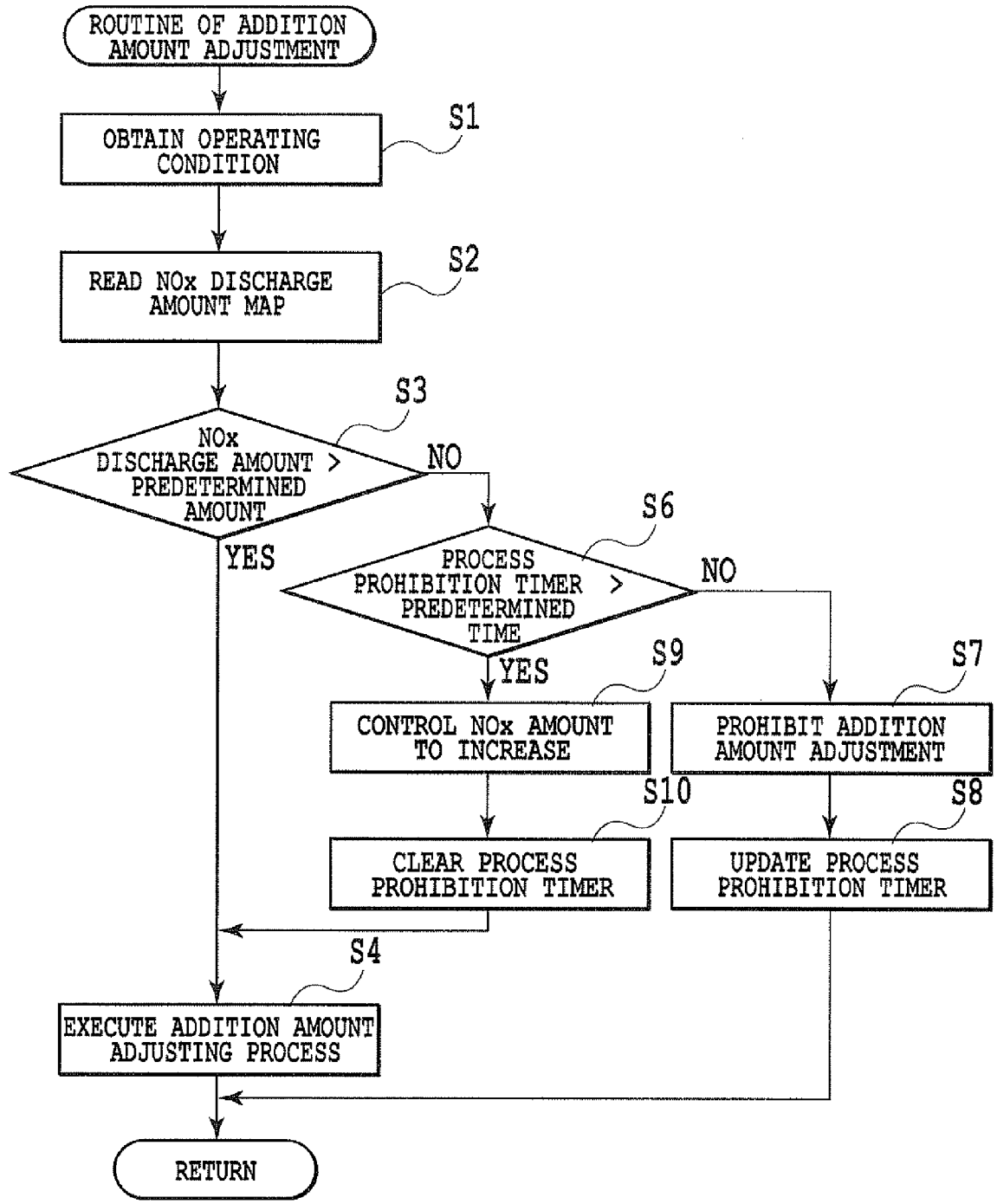
FIG. 4 is a flow chart showing an example of a urea water addition amount adjusting process by an ECU.

Hereinafter, an example of the addition amount adjusting process of the urea water by the ECU 100 will be explained with a flow chart shown in FIG. 4. It should be noted that an addition amount adjusting routine shown in FIG. 4 is executed after a start-up of an internal combustion engine, for example, for each predetermined time.

First, an operating condition of the internal combustion engine 1 is obtained (step S1). The operating condition includes various types of state amounts relating to a NOx generation amount of the internal combustion engine 1, such as a cooling water temperature of the internal combustion engine 1, a load applied to the internal combustion engine 1, an atmospheric pressure, an outside air temperature, and the like.

Next, a NOx discharge amount of the internal combustion engine 1 estimated from a NOx discharge amount map defined in accordance with the operating condition of the internal combustion engine 1 is read (step S2).

Next, it is determined whether or not the NOx discharge amount estimated from the NOx discharge amount map is larger than a predetermined amount (step S3). The predetermined amount herein is a value for determining whether or not the NOx concentration obtained from the output of the NOx sensor 80 including the measurement error becomes a NOx concentration making it possible to determine excess or lack of the ammonia addition amount added to the selective catalytic reduction catalytic converter 70. That is, the predetermined amount is determined as needed from a viewpoint of being capable of determining whether the ammonia addition amount added to the selective catalytic reduction catalytic converter 70 is excessive or lacking to an optimal amount from the output of the NOx sensor 80 provided in the vicinity of the outlet in the selective catalytic reduction catalytic converter 70. Specially the predetermined amount may be defined, for example, based upon a relative ratio between a NOx concentration detected by the NOx sensor 80 and a measurement error in the output of the NOx sensor 80 in the NOx concentration. That is, the predetermined amount is a NOx discharge amount under a condition that the ratio of the measurement error to the output of the NOx sensor 80 provided in the vicinity of the outlet of the selective catalytic reduction catalytic converter 70 is less than a predetermined value. In a case where the NOx discharge amount estimated from the NOx discharge amount map exceeds this predetermined amount, it can be determined that the internal combustion engine 1 is in a condition that a NOx amount to be generated increases as compared to a regular operating condition. Since the NOx amount to be generated in the internal combustion engine 1 increases, the output of the NOx sensor 80 in the vicinity of the outlet of the selective catalytic reduction catalytic converter 70 is sufficiently high as a result, and the relative ratio of the measurement error is smaller.

A case where the NOx amount to be generated in the internal combustion engine 1 increases and exceeds the predetermined amount may include a case where the NOx discharge amount increases in a high-load operating time or by a low atmospheric pressure during vehicle traveling at high altitudes. Since a cooling water temperature is low immediately after a start-up of the internal combustion engine 1, control of reducing a recirculation amount of an EGR gas from the EGR passage 30 is usually performed and therefore the NOx amount to be generated in the internal combustion engine 1 increases. In addition, also in a case where a temperature of intake air introduced into the intake passage 20 is low, the control of reducing the recirculation amount of the EGR gas from the EGR passage 30 is usually performed and therefore the NOx amount to be generated in the internal combustion engine 1 increases.

At step S3, in a case where the NOx amount generated in the internal combustion engine 1 is larger than the predetermined amount, the urea water addition amount adjusting process is executed (step S4). In consequence, in a case where the addition amount of the urea water from the urea water adding valve 60 is lacking or excessive, the adding amount of the urea water is corrected to an optimal amount based upon the output of the NOx sensor 80.

At step S3, in a case where it is determined that the NOx amount to be generated in the internal combustion engine 1 is smaller than the predetermined amount, it is determined whether or not a process prohibition timer elapses a predetermined time (step S6). Here, "process prohibition timer" manages a cumulative time for which the execution of the urea water addition amount adjusting process continues to be prohibited. For example, in a case where the internal combustion engine 1 is normally operating, the NOx amount is small and the urea water addition amount adjusting process based upon the output of the NOx sensor 80 is not executed. Therefore, in a case where the normal operation in which the NOx generation amount is small lasts for a long period of time, there is a possibility that the urea water addition amount from the urea water adding valve 60 is changed and is out of an optimal addition amount. Therefore, the time in which the execution of the urea water addition amount adjusting process continues to be prohibited is managed by the process prohibition timer, and in a case where the time in which the urea water addition amount adjusting process is not executed exceeds, for example, 100 hours, the urea water addition amount adjusting process is forcibly executed. It should be noted that, in addition to managing the execution of the urea water addition amount adjusting process based upon the operating time of the internal combustion engine 1, the execution of the urea water addition amount adjusting process may be managed based upon a traveling distance of a vehicle provided with the internal combustion engine 1, for example, the urea water addition amount adjusting process is executed for each traveling of 1000 km. The frequency of the execution of the urea water addition amount adjusting process may be adjusted as needed.

At step 6, in a case where a value of the process prohibition timer does not exceed a predetermined time, the urea water addition amount adjusting process is prohibited as described above (step S7), and the process prohibition timer is updated (step 38). Therefore, the value of the process prohibition timer is increased.

At step 6, in a case where the value of the process prohibition timer exceeds the predetermined time, control of increasing the NOx amount is performed (step S9). The control of increasing the NOx amount increases the NOx amount to be generated in the internal combustion engine 1 during a period of executing the urea water addition amount adjusting process. In addition, the control of increasing the NOx amount increases the NOx amount to be generated in the internal combustion engine 1, for example, to an amount exceeding the predetermined amount explained at step S3.

A method of increasing the NOx amount to be generated in the internal combustion engine 1 may include a method of closing the above EGR valve 26 to stop supply of the EGR gas to the intake passage 20. In addition, the opening and closing valve 33 of the aforementioned EGR passage 30 is closed, the opening and closing valve 36 provided in the bypass passage 35 is opened, and the EGR cooler 32 is bypassed to circulate the EGR gas to an intake system, thereby increasing a temperature of the intake air. As a result, the NOx amount to be generated in the internal combustion engine 1 can be increased. Further, by advancing timing of fuel injection from an injector provided in each cylinder of the internal combustion engine 1, the NOx amount to be generated in the internal combustion engine 1 can be increased.

At step S9, after executing the NOx amount increasing control, the aforementioned process prohibition timer is cleared to zero (step S10).

In the above embodiment, the explanation is made of a case of using the urea water as the reducing agent, but the present invention is not limited thereto, and ammonia may be used as the reducing agent.

In the above embodiment, the explanation is made of a case of estimating the NOx concentration of the exhaust gas supplied to the selective catalytic reduction catalytic converter 70 by using the map, and the NOx sensor may be provided upstream of the selective catalytic reduction catalytic converter 70 in the exhaust passage 10 to directly detect the NOx concentration of the exhaust gas supplied to the selective catalytic reduction catalytic converter 70.

The invention claimed is:

1. An exhaust purifying device for an internal combustion engine comprising:
   a selective catalytic reduction catalyst provided in an exhaust passage of the internal combustion engine to selectively reduce nitrogen oxides contained in an exhaust gas;
   reducing agent adding means for adding urea water or ammonia to the selective catalytic reduction catalyst as a reducing agent;
   a NOx sensor provided at the downstream side of the selective catalytic reduction catalyst in the exhaust passage; and
   an electronic control unit programmed to adjust an addition amount of the reducing agent based upon an output of the NOx sensor, wherein the electronic control unit is further programmed to:
      execute adjustment of the addition amount of the reducing agent under a condition that a NOx amount to be generated in the internal combustion engine is larger than in a normal operating time,
      prohibit execution of adjustment of the addition amount of the reducing agent in a case where the NOx amount to be generated in the internal combustion engine is smaller than a predetermined amount, and
      execute adjustment of the addition amount of the reducing agent each time when the time in which adjustment of the addition amount of the reducing agent is prohibited exceeds a predetermined threshold time.

2. An exhaust purifying device for an internal combustion engine according to claim 1, wherein
   the condition that the NOx amount to be generated in the internal combustion engine is larger than in a normal operating time can be satisfied by increasing the NOx amount to be generated in the internal combustion engine.

3. An exhaust purifying device for an internal combustion engine according to claim 1, wherein
   the electronic control unit is further programmed to permit adjustment of the addition amount of the reducing agent in a case where the NOx amount to be generated in the internal combustion engine is larger than a predetermined amount.

4. An exhaust purifying device for an internal combustion engine according to claim 1, wherein
   the electronic control unit is further programmed to increase the NOx amount to be generated in the internal combustion engine each time when the time in which adjustment of the addition amount of the reducing agent is prohibited exceeds the predetermined threshold time, at the time the addition amount of the reducing agent is adjusted.

5. An exhaust purifying device for an internal combustion engine according to claim 1, wherein
   the condition that the NOx amount is larger than in the normal operating time includes a condition that the NOx concentration obtained from the output of the NOx sensor containing a measurement error is a NOx concentration making it possible to identify excess or lack of an ammonia addition amount to be added to the selective catalytic reduction catalyst.

6. An exhaust purifying device for an internal combustion engine according to claim 1, wherein
   the condition that the NOx amount to be generated in the internal combustion engine is larger than in the normal operating time is determined based upon a relative ratio between a NOx concentration detected by the NOx sensor and a measurement error in the output of the NOx sensor in the NOx concentration.

* * * * *